United States Patent
Chen et al.

(10) Patent No.: US 11,855,473 B2
(45) Date of Patent: Dec. 26, 2023

(54) CHARGING DEVICE AND METHOD OF CHARGING AND REJUVENATING BATTERY

(71) Applicant: Thunderzee Industry Co., Ltd., Grand Cayman (KY)

(72) Inventors: Rong-Jie Chen, New Taipei (TW); Chih-Hung Lin, San Jose, CA (US)

(73) Assignee: THUNDERZEE INDUSTRY CO., LTD., Grand Cayman (KY)

( * ) Notice: Subject to any disclaimer, the term of this patent is extended or adjusted under 35 U.S.C. 154(b) by 110 days.

(21) Appl. No.: 17/357,764

(22) Filed: Jun. 24, 2021

(65) Prior Publication Data

US 2021/0408816 A1 Dec. 30, 2021

Related U.S. Application Data

(60) Provisional application No. 63/043,139, filed on Jun. 24, 2020.

(51) Int. Cl.
*H02J 7/00* (2006.01)
*H01M 10/48* (2006.01)
*H01M 10/44* (2006.01)

(52) U.S. Cl.
CPC .......... *H02J 7/0069* (2020.01); *H01M 10/44* (2013.01); *H01M 10/48* (2013.01); *H02J 7/0047* (2013.01); *H02J 7/0071* (2020.01); *H02J 7/00712* (2020.01)

(58) Field of Classification Search
CPC .................................................. H02J 7/007
See application file for complete search history.

(56) References Cited

U.S. PATENT DOCUMENTS

| | | | | |
|---|---|---|---|---|
| 3,732,481 A | * | 5/1973 | Mas | H02J 7/00711 320/147 |
| 5,508,598 A | * | 4/1996 | Al-Abassy | H02J 7/007182 320/132 |
| 5,646,505 A | * | 7/1997 | Melnikov | H02J 7/02 320/DIG. 27 |
| 2005/0068038 A1 | * | 3/2005 | Hsiao | H02J 7/0044 324/426 |

(Continued)

OTHER PUBLICATIONS

STIC search report.*

*Primary Examiner* — Drew A Dunn
*Assistant Examiner* — Tynese V McDaniel
(74) *Attorney, Agent, or Firm* — Birch, Stewart, Kolasch & Birch, LLP

(57) ABSTRACT

Various embodiments of a battery charging apparatus are disclosed, along with methods of charging and rejuvenating a battery using the apparatus. The apparatus may include a positive electrode and a negative electrode which are configured to connect to a battery, and a charging current generator generating a charging current that charges the battery for a period of time via the positive and and negative electrodes by adding electric charge to the battery. The charging current is generated based on parameters of the battery, including a charging constant and an initial charging state. In some embodiments, a natural logarithm of a ratio of the added electric charge to the initial charging state substantially equals to a product of the charging constant and a length of the period of time and negative one.

6 Claims, 7 Drawing Sheets

(56) References Cited

U.S. PATENT DOCUMENTS

| | | | |
|---|---|---|---|
| 2006/0197502 A1* | 9/2006 | Kaminsky | H02J 7/0069 |
| | | | 320/131 |
| 2008/0079397 A1* | 4/2008 | Fee | H02J 7/0069 |
| | | | 320/141 |
| 2017/0366015 A1* | 12/2017 | Luo | H02J 7/00 |
| 2018/0212449 A1* | 7/2018 | Park | A61B 5/282 |
| 2020/0230718 A1* | 7/2020 | Ding | B27B 9/00 |
| 2021/0013539 A1* | 1/2021 | Kaburagi | H01M 4/13 |
| 2021/0194264 A1* | 6/2021 | Hale | H01M 10/0525 |
| 2022/0263057 A1* | 8/2022 | Saastamoinen | H01M 10/446 |

* cited by examiner

CHARGING DEVICE AND METHOD OF CHARGING AND REJUVENATING BATTERY

CROSS-REFERENCE TO RELATED PATENT APPLICATIONS

The present disclosure claims the priority benefit of Provisional Application No. 63/043,139, filed on Jun. 24, 2020. The aforementioned application is incorporated by reference in its entirety.

TECHNICAL FIELD

The present invention generally relates to a charging device, to a method for charging a battery cell and to a method for rejuvenating a battery cell. More particularly, the present disclosure is directed to a charging device capable of providing a method to rejuvenate a battery cell having an adverse internal electrical resistance by charging the battery cell using a charging current having a predetermined profile.

BACKGROUND

In the present disclosure, "battery cell", "battery", "cell" are interchangeably used to refer to an electrochemical device that is capable of holding energy stored in a form of electric charges at a certain electric potential. Moreover, the electrochemical device is capable, through a discharging process, of draining or otherwise releasing the stored energy in a form of an electric current, which often passes through an electric load that receives or otherwise consumes the stored energy. The electric current provided by the battery to the load through the discharging process may be referred as an output current of the battery. The output current may be provided at a certain output voltage that may or may not be varying. After the energy stored in a battery drains low due to the discharging process, a charging or recharging process may be applied to the battery to restore or otherwise bring up the energy level therewithin. The charging process generally involves imposing an electric current (referred as a charging current) to the drained battery at a certain electric potential (referred as a charging voltage) from an external source. After the charging process, the battery is again holding energy that can be released through another round of discharging process.

A battery may have repeatedly gone through the charging and discharging processes stated above to provide energy to one or more loads over time. Such a battery may be called a "secondary cell" or "secondary battery". After the charging and discharging processes are repeated for many times on a specific battery, the performance of that battery may age, deteriorate or degrade. For example, the battery may experience a reduction in its capacity after being charged and discharged for a certain number of times. That is, a secondary cell may not be able to hold as much energy within itself as compared to when it was newer. In some cases, the aging or deterioration of the battery may be manifested in degradation in the battery performance, such as a lower output current and/or a lower output voltage the battery is able to provide. Additionally or alternatively, the deterioration may be manifested in a longer time, a larger charging voltage, and/or a larger charging current that is required to restore the energy held in the battery. Furthermore, a secondary cell which contains a liquid may for example generate a gas, such as hydrogen or methane, when the secondary cell is subjected to charging or discharging, resulting in a problem of gassing.

A few techniques have been adopted to lessen or otherwise slow down the battery deterioration process for lead-acid batteries. For example, battery performance could be boosted, and its life prolonged by as much as 3 times, if sulfate accumulated on the electrodes of the battery is reduced or removed. Nevertheless, there have not been effective charging methods proposed for lithium-based batteries or metal-fuel cells to slow down or lessen battery deterioration.

SUMMARY

An object of the present disclosure is to provide an apparatus for charging and/or rejuvenating a battery using a predefined algorithm that provides a safe and effective battery charging process.

In one aspect, an apparatus for charging a battery is provided. The apparatus includes a positive electrode configured to connect to a positive terminal of the battery, as well as a negative electrode configured to connect to a negative terminal of the battery. The apparatus further includes a charging current generator that is configured to generate a charging current that charges the battery via the positive electrode and the negative electrode. The charging process may be in effect for a period of time called charging duration, and charges the battery by adding electric charge to the battery with the charging current. Specifically, the charging current is generated based on at least two parameters of the battery, i.e., a charging constant and an initial charging state. The charging constant is a positive number, whereas the initial charging state is an initial condition of the charging process, representing the electric charge added to the battery at a beginning of the charging duration.

In some embodiments, a natural logarithm of a ratio of the added electric charge to the initial charging state substantially equals to a product of the charging constant and a length of the charging duration and a real number, negative one (−1). That is, the equation (4) described hereinbelow is employed by the apparatus to govern the charging process.

In some embodiments, the apparatus further includes a battery diagnosis module. The battery diagnosis module is configured to diagnose the battery to determine battery parameters including the charging constant and the initial charging state. In some embodiments, the battery diagnosis module may also collect or otherwise detect additional battery parameters for the apparatus to determine the charging duration.

In some embodiments, the apparatus further includes a mode switch. The mode switch has two positions, and is capable of toggling between a first position and a second position. Through the mode switch the apparatus can be configured in one of the following two modes. When the mode switch is toggled to the first position, the apparatus is in a battery charging mode, wherein the positive electrode and the negative electrode are coupled to the charging current generator. When the mode switch is toggled to the second position, the apparatus is in a battery diagnosing mode, wherein the positive electrode and the negative electrode are coupled to the battery diagnosis module.

In some embodiments, the charging current generated by the charging current generator comprises an impulse charging current.

In some embodiments, the charging current generated by the charging current generator comprises an impact charging current.

In some embodiments, the charging current generated by the charging current generator comprises a non-linear asymmetrical charging current.

In another aspect, a method of charging a battery is provided. The method involves providing a charging device having a positive electrode and a negative electrode. The method also involves connecting the charging device with the battery by coupling the positive electrode and the negative electrode to a positive terminal of the battery and a negative terminal of the battery respectively. The method also involves determining an initial charging state and a charging constant. The method further involves providing a charging current to the battery for a period of time to add electric charge to the battery. Specifically, the charging current is provided to the battery in a way that a natural logarithm of a ratio of the added electric charge to the initial charging state substantially equals to a product of the charging constant and a length of the period of time and a real number negative one (−1). Namely, the equation (4) described hereinbelow is governing the charging process.

In yet another aspect, a method of rejuvenating a battery is provided. The method involves providing a charging device having a positive electrode and a negative electrode. The method also involves connecting the charging device with the battery by coupling the positive electrode and the negative electrode to a positive terminal of the battery and a negative terminal of the battery respectively. The method further involves performing a rejuvenating operation to the battery, wherein the rejuvenating operation involves: 1) determining an initial charging state; 2) determining a charging constant; 3) determining a rejuvenation duration in time; and 4) providing a rejuvenating current to the battery for the rejuvenation duration to add electric charge to the battery. Specifically, a natural logarithm of a ratio of the added electric charge to the initial charging state substantially equals to a product of the charging constant and rejuvenation duration and negative one. Namely, the equation (4) described hereinbelow is governing the rejuvenating current used in the rejuvenating operation.

In some embodiments, the method of rejuvenating a battery further involves determining a resistance reduction of the battery after the rejuvenating operation. The resistance reduction represents a change of an internal resistance of the battery before and after the rejuvenating operation. Moreover, the method also involves performing a subsequent round of the rejuvenating operation in an event that the resistance reduction is greater than a predetermined threshold.

In some embodiments, the resistance reduction is an absolute value of the change of the internal resistance before and after the rejuvenating operation. In some other embodiments, the resistance reduction is a percentage of the change of the internal resistance before and after the rejuvenating operation.

In some embodiments, the method of rejuvenating a battery further involves repeating the performing of rejuvenating operation and the determining of the resistance reduction until the resistance reduction is determined to be less than or equal to the predetermined threshold.

In some embodiments, any of the battery parameters (e.g., the initial charging state, the charging constant, or the rejuvenation duration) for the subsequent round or rounds of the rejuvenating operation may not need to be actively determined. Instead, the method may reference to the value of the parameter from a previous round of the rejuvenating operation. For example, the method may simply reuse the same parameter value(s) from a previous round of the rejuvenating operation for the current round.

BRIEF DESCRIPTION OF THE DRAWINGS

In order to clearly explain specific embodiments according to the present disclosure or technical solutions according to prior art, a brief description of accompanying drawings required by descriptions on the specific embodiments or the prior art is given below. Obviously, the drawings described as follows illustrate certain embodiments of the present disclosure. For an ordinary one skilled in the art, without any creative work, other drawings may also be derived or otherwise obtained according to these drawings.

DETAILED DESCRIPTION OF THE PREFERRED EMBODIMENTS

Figure 1:
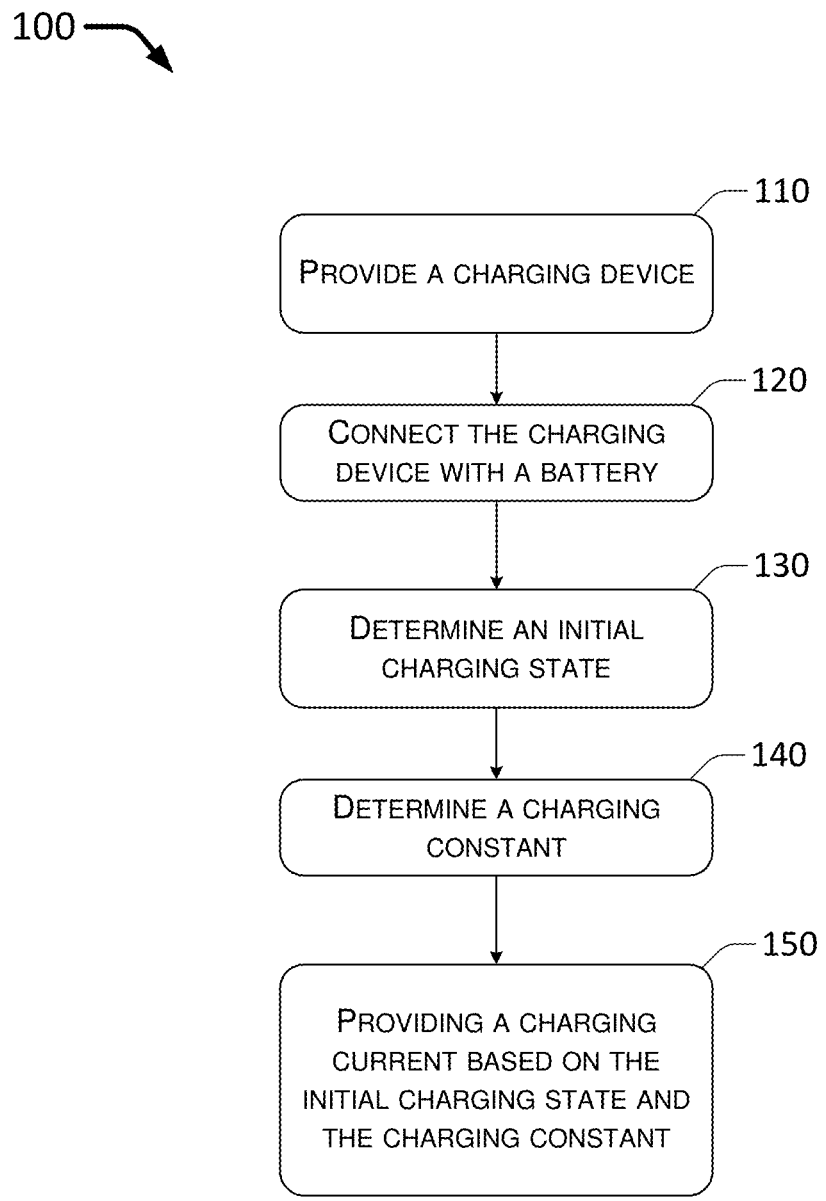
FIG. 1 illustrates a flow diagram of an example process for charging a battery.

Various exemplary embodiments according to the present disclosure are described in detail hereafter and shown in the drawings. In the description with reference to the drawings, the same reference numbers in the drawings denote elements having a same or similar function, unless otherwise stated. Not all of the possible embodiments consistent with the present disclosure are disclosed herein. Instead, only several non-limiting exemplary embodiments are described hereinafter referring to the system examples according to an aspect of the present disclosure or according to the details described in the attached claims.

The drawings herein, as an integral part of the present disclosure, is intended to illustrate or otherwise demonstrate inventive principles of the present disclosure as applied to the various embodiments disclosed herein. Unless stated otherwise, any mentioning of a physical direction or orientation regarding an embodiment herein is for the convenience of explaining the inventive ideas of the present disclosure in view of the embodiment, rather than limiting the inventive ideas only to the specific direction or orientation mentioned. For example, terms describing a relative physical relationship, such as "upward", "downward", "vertical", "horizontal", "on top of", "underneath", "above", "below", "top", "bottom", as well as other derivative adjectives, adverbs, or terms, are used with a sole intention to describe features of an embodiment, which may be as shown in the drawings, but not to limit the features to being only so structured or operated in the specific direction or orientation, unless such a limitation is specifically stated in the description.

As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to". Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

When an element or layer is referred to as being "on", "connected to", "attached to", "coupled with" or "interlinked with" another element or layer, it may be directly on or directly connected to the other element or layer, or intervening elements or layers may be presented. Unless stated otherwise, a connection may be a fixed connection wherein the two connected parts do not have a relative movement, or a flexible connection wherein the two connected parts may have a relative movement.

The various embodiments disclosed herein are for the purpose of serving as examples for demonstrating inventive features and benefits of the present disclosure. That is, the inventive principles of the present disclosure are not limited to the applications of the exemplary embodiments. Any application utilizing one of the inventive features described herein, or a combination of a few inventive features thereof, is within the scope of the present disclosure. The scope of the present disclosure is limited only by the claims presented herein.

As described above, it is in need to have a method of effective charging lithium-based batteries or metal-fuel cells that helps to slow down or lessen the battery deterioration due to repeated charging and discharging processes over time. Moreover, the method is desired to be a safe method and avoid the battery from exceeding a critical condition that may cause the battery to explode during the charging process. Such a method of charging a cell is described below in the present disclosure. Moreover, a method of rejuvenating a cell is also described in the present disclosure, wherein the method of rejuvenating the cell includes multiple rounds of execution of the method of charging the cell, among other steps. The purpose of rejuvenating a secondary battery is to improve the state of the secondary battery such that the secondary battery may again perform close to a new battery in terms of battery capacity, output voltage, output current, time required to recharge, current required to recharge, and/or voltage required to recharge, etc.

Methods for charging and rejuvenating a cell according to the present disclosure are constructed based on an observation that there exists certain similarity between electrochemical reactions within lithium (Li) based batteries or metal-fuel cells and chemical reactions of high explosives (HEs), such as Trinitrotoluene (TNT). Specifically, principles of reversible intercalation in graphite and intercalation into cathodic oxides may be applied to lithium-based batteries and metal-fuel cells. An example of the similarity is seen in cases where Li-ion batteries would explode like a bomb under certain conditions, such as overcharging over the critical point, or electrical short-circuit due to penetration or gas bubbles generated within a battery. The overreaction within a battery, such as overcharging or over-discharging the electrolyte of the battery, may generate a gas that results in an explosion. Therefore, the reaction dynamics of a battery explosion is in many ways similar to that of TNT explosion beyond its flash point at 464° F. (240° C.).

Chemical reaction of TNT is governed by the following pseudo first-order reaction rate equation:

$$\frac{dC_{TNT}}{dt} = -k_1 C_{TNT} \qquad (1)$$

The following is obtained by taking an integral of equation (1):

$$\ln\frac{C_{TNT}}{C_{TNT}^0} = -k_1 t \qquad (2)$$

In equations (1) and (2), t represents time, $C_{TNT}$ represents the concentration of TNT at time t, and $C^0_{TNT}$ represents the concentration of TNT when time=0 (i.e., the initial concentration). $C_{TNT}$ and $C^0_{TNT}$ may have a unit of mol/L. In equations (1) and (2), $k_1$ is a constant having a positive value, which can be characterized or otherwise obtained using experiment data. For example, given measured data of $C_{TNT}$ as it varies with time after an explosion, the value of the constant $k_1$ may be obtained by plotting a curve of $\log(C_{TNT})$ versus time, followed by applying linear regression to the curve.

Based on the aforementioned reaction similarity between high explosives and batteries, a battery charging method is provided hereinbelow to safely and effectively charge a battery. Specifically, a controller may control a charging current that charges the battery such that the amount of electric charge added to the battery is governed by the following equation:

$$\frac{dE_{bat}}{dt} = -k_2 E_{bat} \qquad (3)$$

Taking an integral of equation (3), it is obtained that:

$$\ln\frac{E_{bat}}{E_{bat}^0} = -k_2 t \qquad (4)$$

In equations (3) and (4), t represents time (i.e., charging time; namely, the length of time since the beginning of the charging process), $E_{bat}$ represents the electric charge added to the battery by the charging current at time t, and $E^0_{bat}$, referred as the initial charging state, represents the electric charge added to the battery by the charging current when time=0 (i.e., at the beginning of the charging process). $E_{bat}$ and $E^0_{bat}$ may have a unit of coulomb. Each individual battery may have a respective $E^0_{bat}$ value to itself. In some embodiments, $E^0_{bat}$ may be determined depending on the specific type or model of the battery.

In equations (3) and (4), $k_2$ is a constant having a positive value, which can be characterized as an acceptance ratio, which is a ratio between the initial charging state and the charge to be put back into the battery, or otherwise obtained using experiment data in a way similar to how constant $k_1$ is obtained for TNT. Different types or models of batteries may have different values of the constant $k_2$. The constant $k_2$ may be referred as a charging constant. Each of the charging constant $k_2$ and the initial charging state $E^0_{bat}$ is a parameter of the battery.

The controller may control the charging current to charge the battery using various charging waveforms. As long as equations (3) and/or (4) are fulfilled over the time of the charging process in an on-average manner, various charging waveforms, presented as a time function of voltage or current, may be applied to the battery, wherein the charging voltage may be correlated to the charging current. For example, the waveform may represent an impulse charging current or voltage, which helps to minimize gas generation in the electrolyte of the battery during the charging process, thereby reducing a chance of battery explosion. In some embodiments, the waveform may represent an impact charging current or voltage. In some embodiments, the waveform may be a non-linear asymmetrical charging current or voltage. The controller may employ any of the waveforms mentioned hereinbefore, or an arbitrary combination thereof, such that equation (4) is fulfilled over time.

FIG. 1 illustrates a flow diagram of an example process 100 for charging a battery. Process 100 may include blocks 110, 120, 130, 140 and 150. Process 100 may begin at block 110.

At block 110, a charging device is provided for charging the battery, which may or may not be a secondary battery. The charging device is able to provide a charging current to the battery. The charging device may have a positive electrode and a negative electrode, via which the charging device may interface with or otherwise couple to the battery. The charging device may further have a control unit for executing one or more of the following steps of process 100. Process 100 may proceed from block 110 to block 120.

At block 120, the battery is connected or otherwise electrically coupled to the charging device. Specifically, the positive electrode of the charging device is electrically coupled to a positive terminal of the battery, whereas the negative electrode of the charging device is electrically coupled to a negative terminal of the battery. Process 100 may proceed from block 120 to block 130.

At block 130, an initial charging state, e.g., $E^0_{bat}$ in equations (3) and (4), may be determined. The control unit of the charging device may determine the initial charging state. In some embodiments, the initial charging state may be determined depending on the specific type or model of the battery. The control unit may refer to a look-up table that stores values of the initial charging state for various battery types and/or models. In some embodiments, the charging device may diagnose the battery to determine the initial charging state. The diagnosis may be performed by sending test signals to the battery via the positive and negative electrodes of the charging device. Process 100 may proceed from block 130 to block 140.

At block 140, a charging constant, e.g., $k_2$ in equations (3) and (4), may be determined. The control unit of the charging device may determine the charging constant. In some embodiments, the charging constant may be determined depending on the specific type or model of the battery. The control unit may refer to a look-up table that stores values of the charging constant for various battery types and/or models. In some embodiments, the charging device may diagnose the battery to determine the charging constant. The diagnosis may be performed by sending test signals to the battery via the positive and negative electrodes of the charging device. Process 100 may proceed from block 140 to block 150.

At block 150, a charging current is provided to the battery from the charging device based on the initial charging state determined at block 130 as well as the charging constant determined at block 140. For example, the charging current may be provided to the battery in a way that equation (4) is fulfilled in an on-average manner. That is, a natural logarithm of a ratio of the added charge to the initial charging state equals to a product of the charging constant and the charging time and the real number negative one (−1).

In some embodiments, various waveforms may be employed to realize the charging current. The waveform may include an impulse charging current or voltage, an impact charging current or voltage, a non-linear asymmetrical charging current or voltage, or any two or more above piece-wisely concatenated in time. In some embodiments, the charging voltage may be correlated to the charging current and controlled by the charging device.

Figure 2:
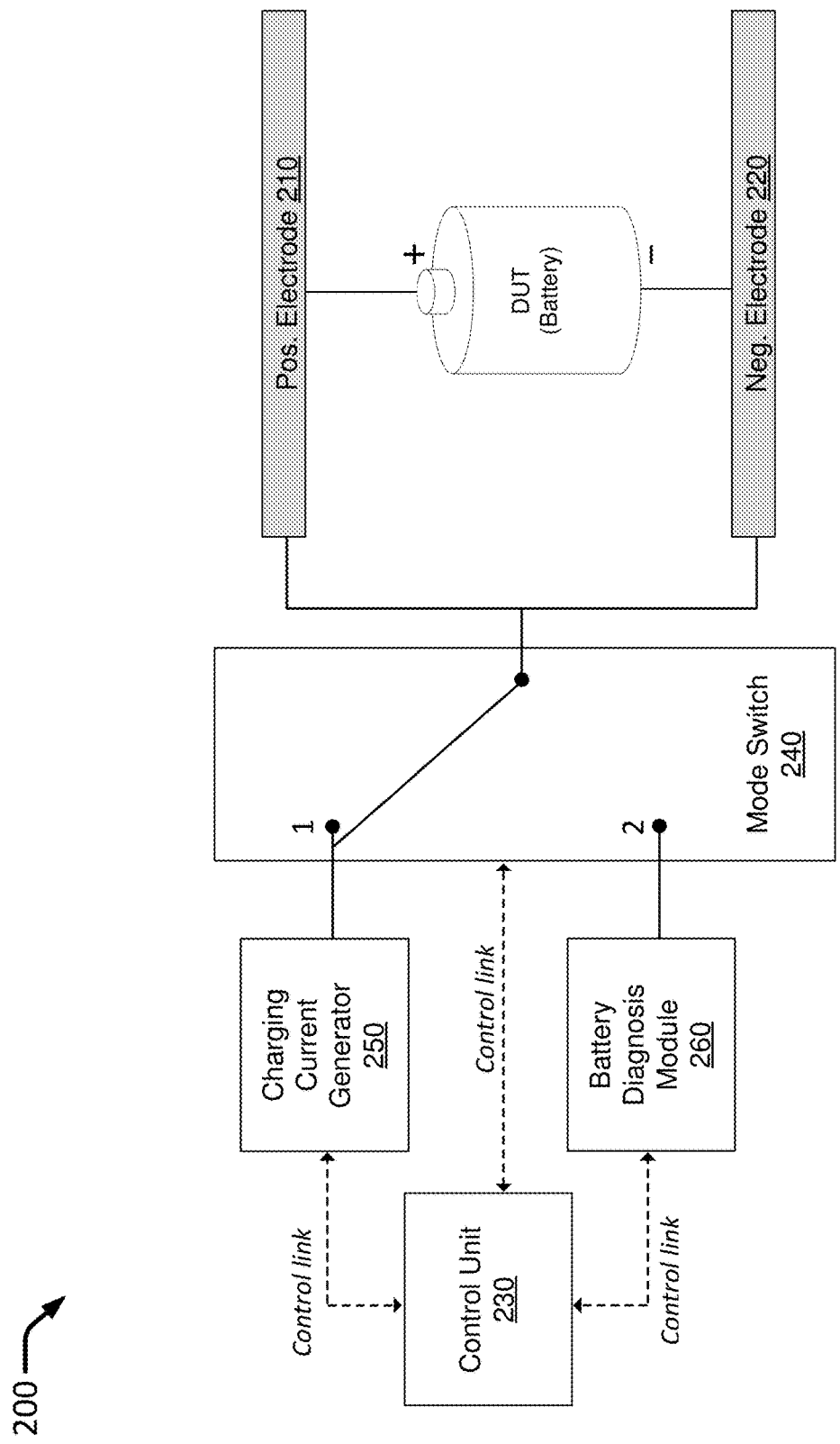
FIG. 2 illustrates a block diagram of an example charging device.

FIG. 2 illustrates a block diagram of an example charging device 200, which is capable of realizing the process 100 of charging a battery. The charging device 200 includes a positive electrode 210 and a negative electrode 220. The battery (labeled as "DUT" in FIG. 2) is connected to the charging device 200 via the positive electrode 210 and the negative electrode 220. Specifically, the positive electrode 210 is electrically coupled to a positive terminal of the battery, whereas the negative electrode 220 is electrically coupled to a negative terminal of the battery. The charging device 200 also includes a charging current generator 250 for generating a charging current, a battery diagnosis module 260 for diagnosing or otherwise determining a state of the battery, such as measuring an internal resistance of the battery. The charging device 200 also includes a mode switch 240 that connects the battery to either the charging current generator 250 or the battery diagnosis module 260 through the positive electrode 210 and the negative electrode 220.

The charging device 200 further includes a control unit 230, which is coupled to the mode switch 240, the charging current generator 250, and the battery diagnosis module 260 via respective control links shown in FIG. 2. The control unit 230 may configure the mode switch 240 to be at either position 1 or position 2. The charging device 200 is configured to operate in a charging mode when the mode switch 240 is configured to be at position 1, wherein the battery is electrically coupled to the charging current generator 250 to receive the charging current generated by the charging current generator 250. The charging device 200 is configured to operate in a diagnosing mode when the mode switch 240 is configured to be at position 2, wherein the battery is electrically coupled to the battery diagnosis module 260 to be diagnosed by the battery diagnosis module 260. In some embodiments, when the charging device 200 is in the diagnosing mode, the control unit 230 may communicate with the battery diagnosis module 260 to determine the initial charging state (e.g., as at the block 130 of process 100) and/or the charging constant (e.g., as at the block 140 of process 100) as the control unit 230 configures the mode switch 240 to be at position 2. The control unit 230 may subsequently configure the mode switch 240 to be at position 1 to have the charging device 200 enter the charging mode so that the charging current generator 250 may charge the battery with the charging current generated by the charging current generator 250 based on the initial charging state and the charging constant.

In some embodiments, the charging current generator 250 may generate the charging current in the presence of a charging voltage. Moreover, the charging voltage may be correlated to the charging current, and is also controlled by the charging current generator 250.

The aging of a battery cell after repeated charging and discharging may be manifested in an increasing internal electrical resistance of the battery cell. The internal resistance generally becomes higher as the battery ages. Namely, the value of the internal resistance of a battery is a fair indication of the health of the battery, concerning how well the battery may perform. A battery during a time when it exhibits a lower internal resistance generally perform better than the battery during another time when it exhibits a higher internal resistance. In some embodiments, the charging device 200 can be utilized to "rejuvenate" a secondary battery, i.e., to bring down or reduce the internal resistance of the secondary battery through a rejuvenating process, so that improved performance from the battery may result. The charging device 200 may be used to apply the rejuvenating process to a secondary battery having an internal resistance of $R_1$ so that the internal resistance would, after the rejuvenating process, become $R_2$, wherein $R_2 < R_1$. That is, $R_1$ may represent the internal electrical resistance of a cell before a rejuvenating operation while $R_2$ may represent the internal electrical resistance of the cell after the rejuvenating operation, and the rejuvenating operation is deemed successful if $R_2 < R_1$ is achieved. For example, before the rejuvenating operation, the battery may have an internal resistance, $R_1$, of 1.2 ohm, whereas the internal resistance is reduced to a lower value of 0.4 ohm, which is $R_2$, after the rejuvenating operation. In general, the larger the amount by which the internal resistance is reduced after the rejuvenating operation, the more eminent performance improvement may result. In some embodiments, the amount of internal resistance reduction may be represented by an absolute value of the difference between $R_1$ and $R_2$, i.e., $|R_1-R_2|$, such as 1.2−0.4=0.8 ohm in the example above. In some embodiments, the amount of internal resistance reduction may be represented by a percentage in the change of the internal resistance, which can be represented by $|R_1-R_2|/R_1$, $|R_1-R_2|/R_2$, or $|R_1-R_2|/(R_1+R_2)/2$. In the example above, the resistance reduction is 67% if characterized using $|R_1-R_2|/R_1$.

In some embodiments, the rejuvenating process may include one or more rounds of rejuvenating operation, whereas each round of the rejuvenating operation is similar to at least a portion of the charging process 100. For example, the rejuvenating process may proceed for several rounds of rejuvenating operation, while the internal resistance is being monitored, either continuously or periodically, until the amount of internal resistance reduction between the last two rounds is smaller than a predetermined threshold.

Figure 3:
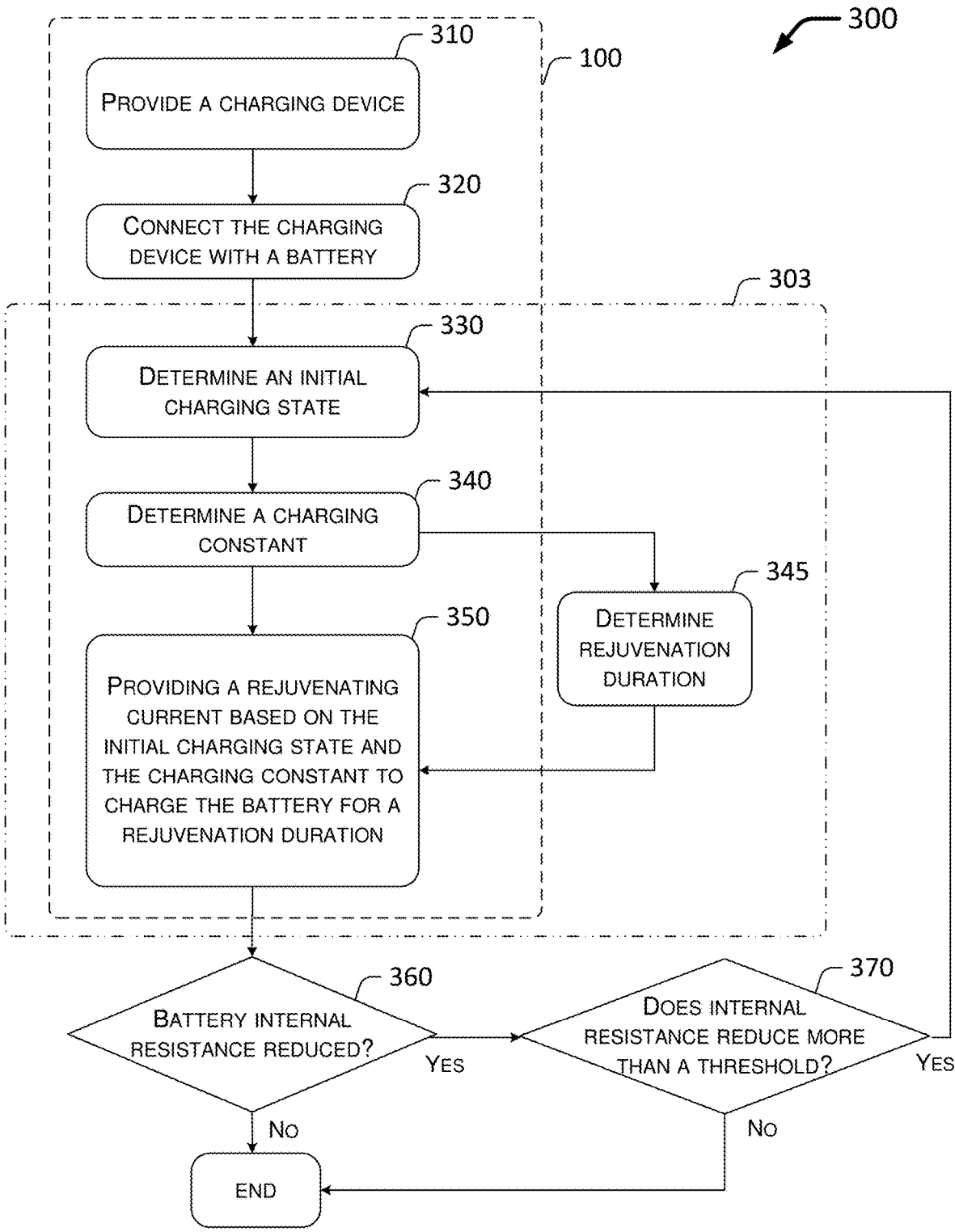
FIG. 3 illustrates a flow diagram of an example process for rejuvenating a battery.

FIG. 3 illustrates a flow diagram of an example process 300 for rejuvenating a battery. The battery may or may not be a secondary battery. The rejuvenating process 300 may be realized by the charging device 200 of FIG. 2, wherein the battery to be rejuvenated is represented by the DUT in FIG. 2. Process 300 may include blocks 310, 320, 330, 340, 345, 350, 360 and 370. Blocks 310, 320, 330, 340 and 350 may be identical or similar to blocks 110, 120, 130, 140 and 150 of process 100, respectively. In some embodiments, blocks 330, 340, and 350 may constitute a rejuvenating operation. In some other embodiments, blocks 330, 340, 345 and 350 may constitute a rejuvenating operation of a current round, such as a rejuvenating operation 303. Process 300 may begin at block 310.

At block 310, a charging device (e.g., the charging device 200) is provided for charging the battery, which may be a secondary battery. The charging device is able to provide a charging current to the battery. The charging device may have a positive electrode (e.g., the positive electrode 210) and a negative electrode (e.g., the negative electrode 220), via which the charging device may interface with or otherwise couple to the battery. The charging device may further have a control unit (e.g., the control unit 230) for executing one or more of the following steps of process 300. Process 300 may proceed from block 310 to block 320.

At block 320, the battery is connected or otherwise electrically coupled to the charging device. Specifically, the positive electrode of the charging device is electrically coupled to a positive terminal of the battery, whereas the negative electrode of the charging device is electrically coupled to a negative terminal of the battery. Process 300 may proceed from block 320 to block 330.

At block 330, an initial charging state, e.g., $E^0_{bat}$ in equations (3) and (4), may be determined. The control unit of the charging device may be used to determine the initial charging state. In some embodiments, the initial charging state may be determined depending on the specific type or model of the battery. The control unit may refer to a look-up table that stores values of the initial charging state for various battery types and/or models. In some embodiments, the charging device may diagnose the battery to determine the initial charging state. The diagnosis may be performed by a battery diagnosis module (e.g., the battery diagnosis module 260) of the charging device. The battery diagnosis module may send test signals to, and read feedback from, the battery via the positive and negative electrodes of the charging device battery for the determining of the initial charging state. Process 300 may proceed from block 330 to block 340.

At block 340, a charging constant, e.g., $k_2$ in equations (3) and (4), may be determined. The control unit of the charging device may be used to determine the charging constant. In some embodiments, the charging constant may be determined depending on the specific type or model of the battery. The control unit may refer to a look-up table that stores values of the charging constant for various battery types and/or models. In some embodiments, the charging device may diagnose the battery to determine the charging constant. The diagnosis may be performed by the battery diagnosis module of the charging device. The battery diagnosis module may send test signals to, and read feedback from, the battery via the positive and negative electrodes of the charging device for the determining of the charging constant. In some embodiments, process 300 may proceed from block 340 to block 345. In some other embodiments, process 300 may bypass block 345 and proceed from block 340 to block 350.

At block 345, a rejuvenation duration may be determined. The rejuvenation duration represents a time duration for which a current round of rejuvenating operation 303 lasts. The charging device may determine the rejuvenation duration. In some embodiments, the rejuvenation duration may be determined depending on the specific type or model of the battery. The control unit may refer to a look-up table that stores values of the rejuvenation duration for various battery types and/or models. In some embodiments, the charging device may diagnose the battery to determine the rejuvenation duration. The diagnosis may be performed by the battery diagnosis module of the charging device. The battery diagnosis module may send test signals to, and read feedback from, the battery via the positive and negative electrodes of the charging device for the determining of the rejuvenation duration. Process 300 may proceed from block 345 to block 350.

At block 350, a rejuvenating current is provided to the battery from the charging device based on the initial charging state determined at block 330 as well as the charging constant determined at block 340. The rejuvenating current may be provided to the battery for a predetermined rejuvenation duration, such as the rejuvenation duration determined at block 345. The rejuvenating current may be provided to the battery in a way that equation (4) is fulfilled in an on-average manner. That is, a natural logarithm of a ratio of the added charge added by the rejuvenating current to the initial charging state equals to a product of the charging constant and a rejuvenation time (i.e., the length of the rejuvenation duration) and the real number negative one (−1). Process 300 may proceed from block 350 to block 360.

At block 360, the charging device may determine whether the internal resistance of the battery that is being rejuvenated is reduced after the current round of rejuvenating operation 303. The internal resistance may be monitored continually or periodically throughout the operation duration of the rejuvenating operation 303. For example, let $R_1$ denotes the internal resistance of the battery prior to the current round of rejuvenating operation 303, and $R_2$ the internal resistance of the battery after the current round of rejuvenating operation 303. Process 300 proceeds from block 360 to block 370 in response to $R_2$ being less than $R_1$. On the other hand, Process 300 ends in response to $R_2$ being equal to or greater than $R_1$.

At block 370, the charging device may determine a resistance reduction of the battery, wherein the resistance reduction represents a change of an internal resistance of the battery before and after the rejuvenating operation 303. That is, the control unit may determine whether or not the internal resistance of the battery reduces more than a predetermined threshold after the current round of rejuvenating operation 303. In some embodiment, the resistance reduction, as well as the predetermined threshold, may be an absolute value (e.g., 0.5 ohm, 0.2 ohm, or 0.04 ohm) of the difference between $R_1$ and $R_2$, i.e., $|R_1-R_2|$. In some embodiments, the resistance reduction, as well as the predetermined threshold, may be a percentage (e.g., 50%, 10%, or 3%) in the change of the internal resistance, represented by, for example, $|R_1-R_2|/R_1$, $|R_1-R_2|/R_2$, or $|R_1-R_2|/(R_1+R_2)/2$. Process 300 proceeds to block 330 for a next round of rejuvenating operation 303 in response to the internal resistance being reduced more than the predetermined threshold. On the other hand, process 300 ends in response to the internal resistance being reduced not more than the predetermined threshold.

In some embodiments, a round of rejuvenating operation 303 may not include actively determining any one, two or all of the initial charging state, the charging constant, and the rejuvenation duration. Instead, a parameter (i.e., the initial charging state, the charging constant, or the rejuvenation duration) may be determined simply by referencing or otherwise reusing the parameter that has been used in a previous round of rejuvenating operation 303.

Figure 4:
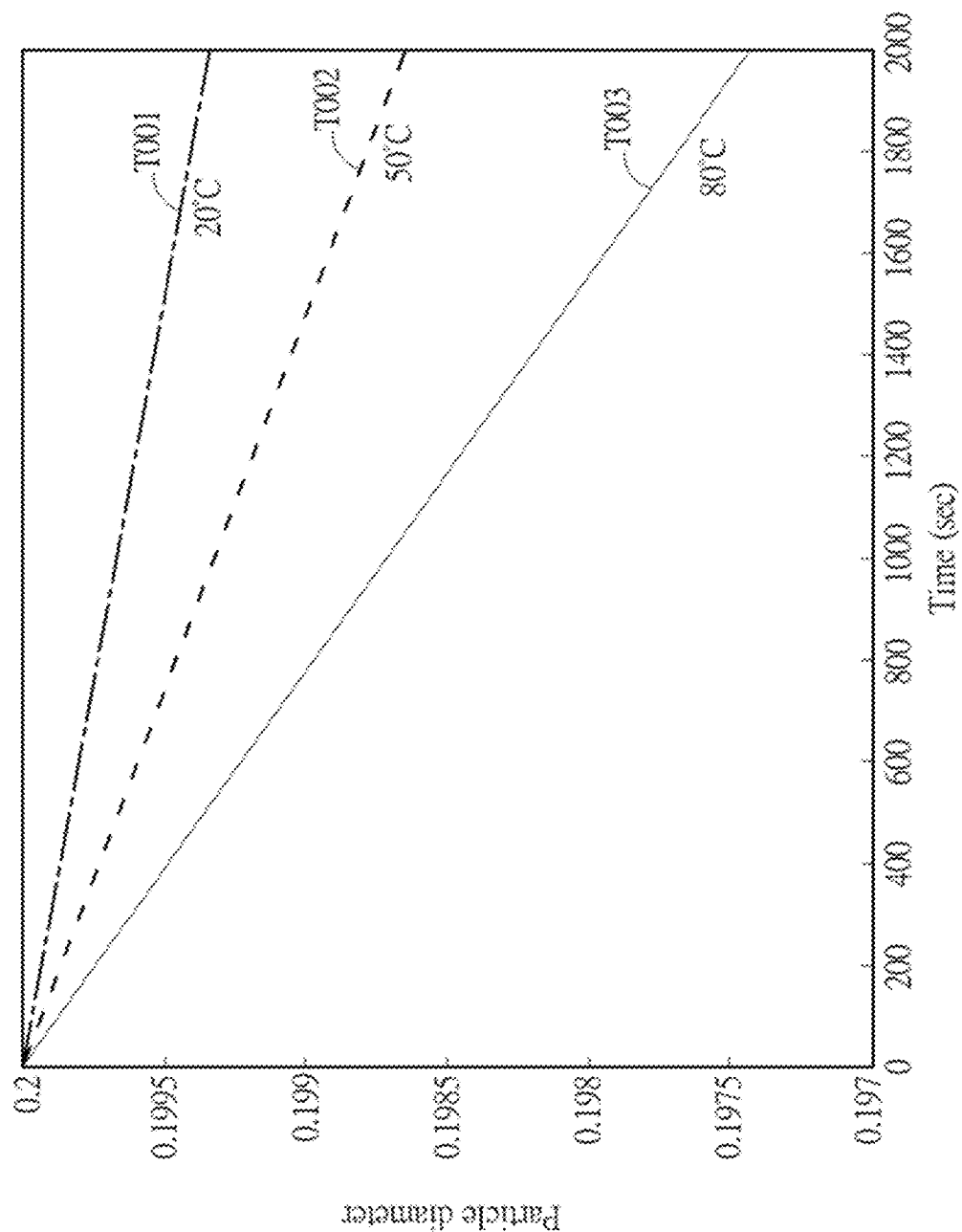
FIG. 4 illustrates simulation curves of TNT particle sizes in a chemical reaction.
Figure 5:
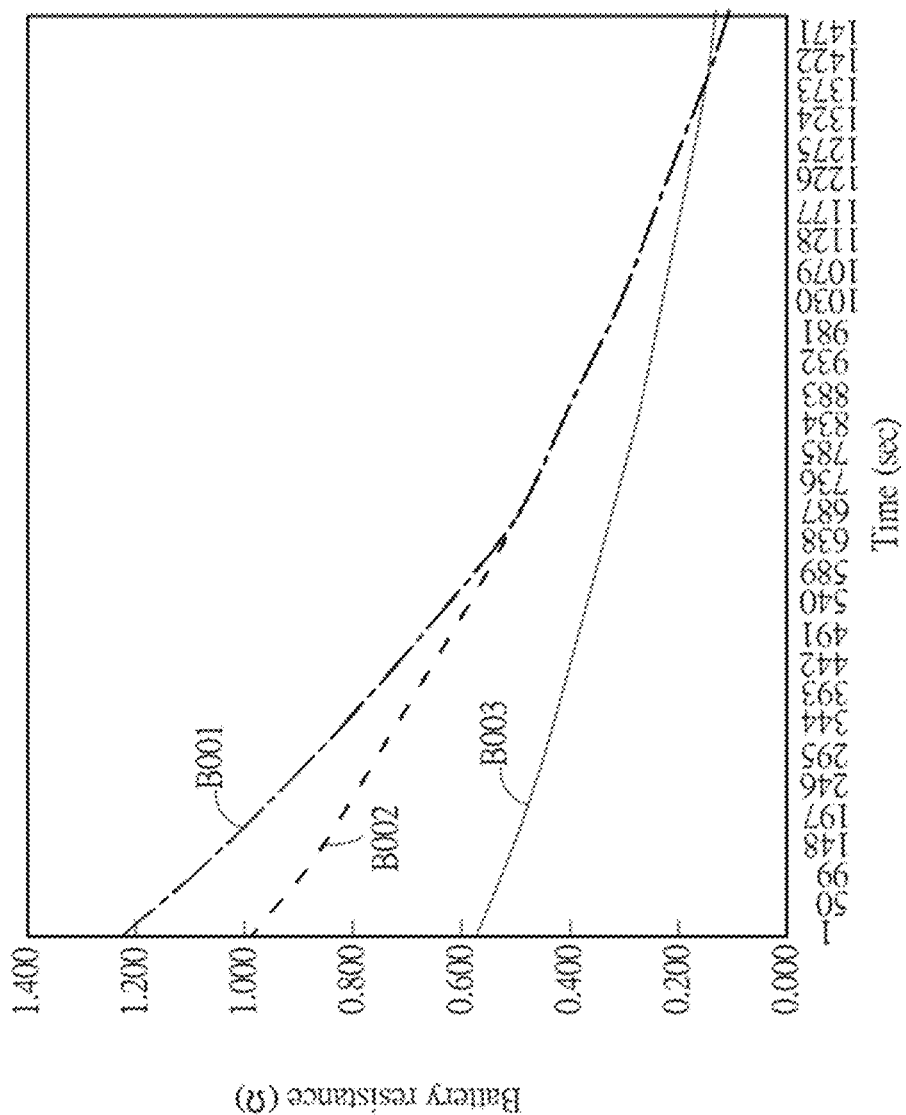
FIG. 5 illustrates simulation curves of the internal resistance of a battery.

Some experiments and simulations have been carried out in accordance with the disclosure hereinabove. FIG. 4 illustrates a first simulated curve based on TNT reaction mechanism, whereas FIG. 5 illustrates a second simulated curve showing how the internal resistance of a battery may vary over the rejuvenating process that is similar to how the TNT particle size changes over time. Both FIG. 4 and FIG. 5 are simulated using a homogeneous model, because it is assumed that each TNT particle is a sphere of the same radius, just like each battery has the same capacity and size. FIG. 4 shows time versus the reduction of TNT particle size, which may correspond to time versus the dissipation of TNT concentration, because the particle diameter is proportional to the concentration.

The curves in FIG. 4 correspond to different temperatures. Curve T001 of FIG. 4 refers to a TNT chemical reaction rate curve at 20° C. Curve T002 of FIG. 4 refers to a TNT chemical reaction rate curve at 50° C. Curve T003 of FIG. 4 refers to a TNT chemical reaction rate curve at 80° C. It is shown that TNT reaction rate (i.e., the slope in FIG. 4 and corresponding to the negative k) goes up as temperature rises, as the TNT reaction rate can be correlated with the constant $k_2$, the value of which can be characterized by finding the asymptotic slope of a curve of FIG. 4. However, if it is over the critical point, it would explode.

FIG. 5 is obtained by simulating impulse current of various levels as the current is applied to a Li-ion battery or a metal-fuel cell. As shown in FIG. 5, the internal electrical resistance of the battery decreases as time increases. Curve B001 refers to an internal electrical resistance curve of a 30 AH lithium battery subject to an impulse charging current. Curve B002 refers to an internal electrical resistance curve of a 50 AH lithium battery subject to an impulse charging current. Curve B003 refers to an internal electrical resistance curve of a 100 AH lithium battery subject to an impulse charging current. It is an impulse charging method determined by a dynamic function of voltage v (t, z), a dynamic function of current, i (t, z), and a dynamic function of internal electrical resistances, z (t, ohm), wherein t represents time and z represents the variations of v, of i, or of ohm.

Figure 6:
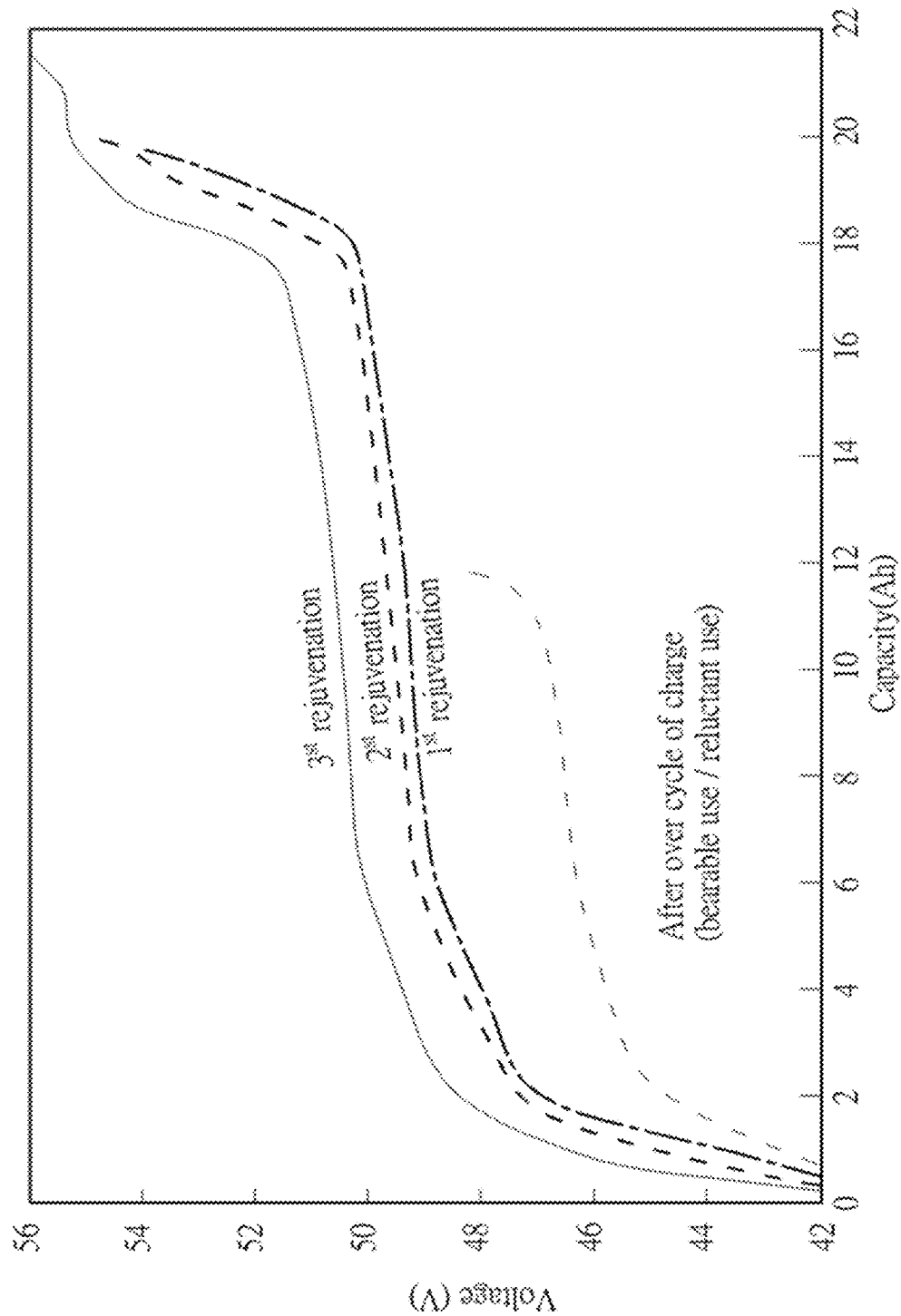
FIG. 6 illustrates the charging of a battery with multiple rejuvenating cycles.
Figure 7:
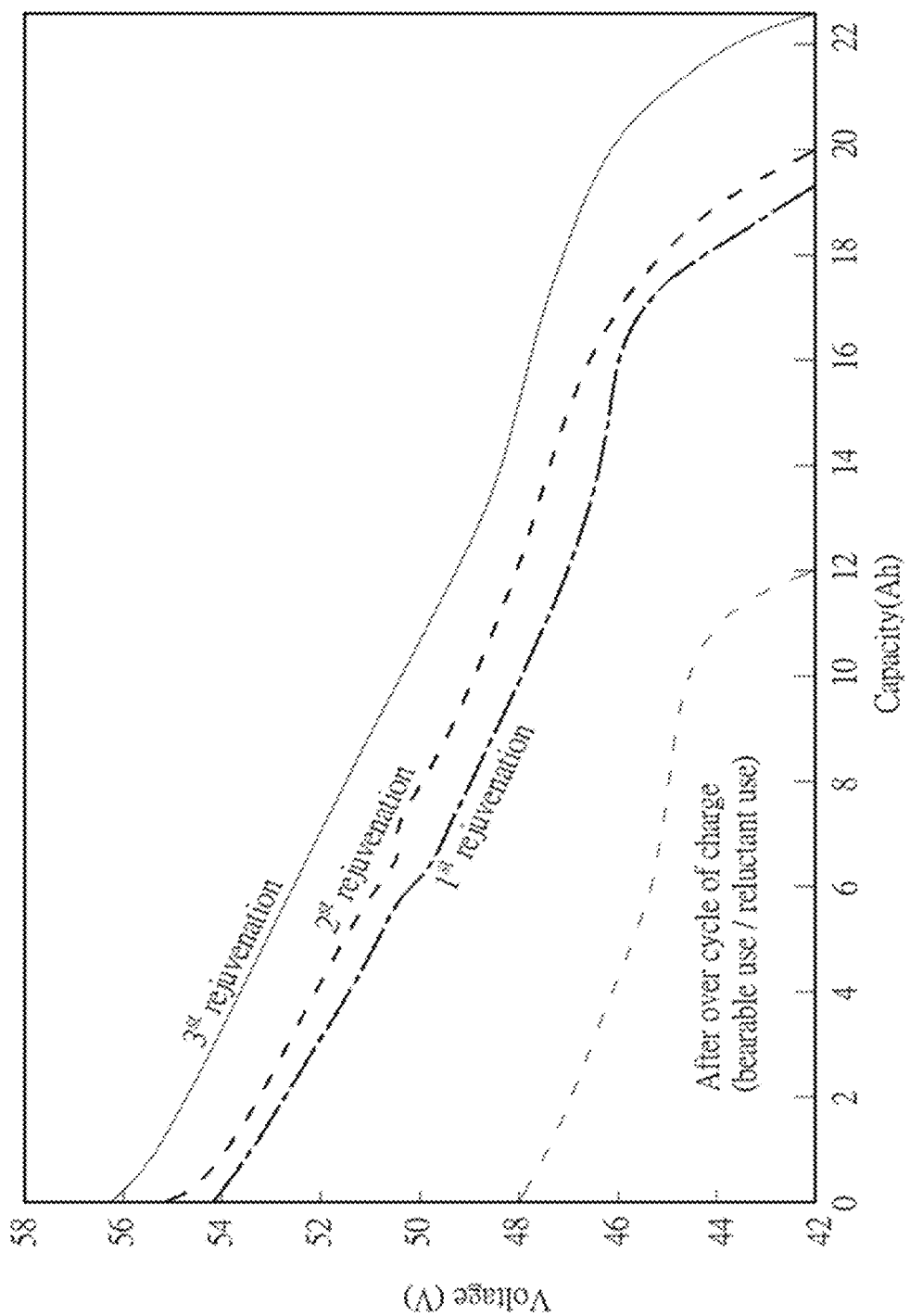
FIG. 7 illustrates the discharging of a battery with multiple rejuvenating cycles.

An algorithm for rejuvenation of different types of batteries is proposed for secondary batteries. FIG. 6 illustrates the charging of a cell with 3 rejuvenating cycles in accordance with a battery rejuvenation algorithm of the present disclosure. FIG. 7 illustrates the discharging of the cell with 3 restoration cycles in accordance with a battery rejuvenation algorithm of the present disclosure. The battery used for obtaining FIG. 6 and FIG. 7 is a 14S10P 18650 lithium battery of 48V/12 Ah charge capacity and of 42V~48V 12 Ah discharge capacity.

After a battery has gone through excessive times of charging and discharging cycles, it may be concluded the battery is no longer usable due to aging. Normally, it is possible to obtain the results as shown in FIG. 6 by trying to force the charging of the battery.

Refer to FIG. 6 and FIG. 7. Multiple rejuvenation attempts, i.e., rounds of rejuvenating operations, may be made to charge a cell by using a battery rejuvenation algorithm as described above, wherein the results are shown in FIG. 6 and FIG. 7 for comparison. After the first rejuvenation attempt to charge a cell by using the battery rejuvenation algorithm, the battery charge capacity is increased to 54V/19 Ah with discharge capacity of 54V to 42V/19 Ah. After the second rejuvenation attempt to charge the same cell by using the battery rejuvenation algorithm, the battery charge capacity is increased to 55V/20 Ah with discharge capacity of 55V to 42V/20 Ah. After the third rejuvenation attempt to charge the same cell by using the battery rejuvenation algorithm, the battery charge capacity is increased to 56.5V/22.5 Ah with discharge capacity of 56.5V to 42V/22.5 Ah.

Based on the experiment and simulation results presented above, it is concluded that the rejuvenating effects on 14S10P 18650 lithium batteries are apparent with the help of the battery rejuvenation algorithm. The battery rejuvenation algorithm works according to specific condition or state of each battery. Therefore, the battery rejuvenation algorithm is ideal for any single core or series/parallel-cell lithium batteries. However, the number of times each lithium battery requires to achieve a satisfactory battery rejuvenation may be different according to brand/model and specific condition of each battery.

Characteristics and benefits of the present disclosure are described with reference to various embodiments detailed above. Accordingly, the present disclosure should not be limited to these exemplary embodiments illustrating combinations of some possible unlimiting features that may exist individually or in the form of other combinations of features.

The embodiments described above are merely demonstrate certain exemplary embodiments of the present disclosure, which are used to illustrate the technical solution of the problem to be addressed, rather than to limit the present disclosure in any way. The protection scope of the present disclosure is not limited to the exemplary embodiments. Although the present disclosure has been described in detail with reference to the above-mentioned embodiments, a person skilled in the art should understand that any person familiar with the technical solution disclosed in the present disclosure is able to modify or change the technical solution recorded in the above-mentioned embodiments, and equally replace some technical features of the present invention. Nevertheless, these modifications, changes and substitutions do not separate the essence of the corresponding technical solutions from the spirit and scope of the technical solutions of the present disclosure, and are covered in the protection scope of the present application. Therefore, the protection scope of the present application shall be subject to the protection scope of the claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of rejuvenating a battery, comprising:
providing a charging device having a positive electrode and a negative electrode;
connecting the charging device with the battery by coupling the positive electrode and the negative electrode to a positive terminal of the battery and a negative terminal of the battery respectively;
performing a rejuvenating operation to the battery, the rejuvenating operation comprising:
determining a rejuvenation duration in time; and
providing a rejuvenating current to the battery for the rejuvenation duration to add electric charge to the battery,
wherein at any given time during the rejuvenation duration a natural logarithm of a ratio of the added electric charge to an initial charging state of the charging current substantially equals to a product of a negative constant and a length of time between a beginning of the rejuvenation duration and the any given time, the initial charging state indicating the electric charge added to the battery by the charging current at the beginning of the rejuvenation duration;

determining a resistance reduction of the battery after the rejuvenating operation, the resistance reduction representing a change of an internal resistance of the battery before and after the rejuvenating operation; and performing a subsequent round of the rejuvenating operation m an event that the resistance reduction is greater than a predetermined threshold.

2. The method of claim 1, wherein the resistance reduction is an absolute value of the change of the internal resistance before and after the rejuvenating operation.

3. The method of claim 1, wherein the resistance reduction is a percentage of the change of the internal resistance before and after the rejuvenating operation.

4. The method of claim 1, further comprising:
repeating the performing of the rejuvenating operation and the determining of the resistance reduction until the resistance reduction is determined to be less than or equal to the predetermined threshold.

5. The method of claim 1, wherein the determining of the initial charging state for the subsequent round of the rejuvenating operation comprises using the initial charging state from a previous round of the rejuvenating operation.

6. The method of claim 1, wherein the determining of the rejuvenation duration for the subsequent round of the rejuvenating operation comprises using the rejuvenation duration from a previous round of the rejuvenating operation.

* * * * *